United States Patent
Sigamani et al.

(10) Patent No.: US 8,861,230 B2
(45) Date of Patent: Oct. 14, 2014

(54) CONTROL CIRCUITS FOR POWER CONVERTERS

(75) Inventors: James Sigamani, Pasig (PH); Yancy Fontanilla Boncato, Quezon (PH)

(73) Assignee: Astec International Limited, Kwun Tong, Kowloon (HK)

( * ) Notice: Subject to any disclaimer, the term of this patent is extended or adjusted under 35 U.S.C. 154(b) by 56 days.

(21) Appl. No.: 13/483,891

(22) Filed: May 30, 2012

(65) Prior Publication Data
US 2013/0322122 A1    Dec. 5, 2013

(51) Int. Cl.
*H02J 3/00* (2006.01)

(52) U.S. Cl.
USPC ............ 363/34; 363/37; 363/89; 363/90; 363/97

(58) Field of Classification Search
USPC .......... 363/34, 37, 44, 48, 81, 82, 84, 89, 90, 363/95, 97
See application file for complete search history.

(56) References Cited

U.S. PATENT DOCUMENTS

| | | | | |
|---|---|---|---|---|
| 4,404,472 A * | 9/1983 | Steigerwald | .................... | 307/46 |
| 4,940,929 A | 7/1990 | Williams | | |
| 6,160,385 A | 12/2000 | Feldtkeller | | |
| 6,473,322 B2 * | 10/2002 | Marien et al. | .................... | 363/82 |
| 7,250,742 B2 * | 7/2007 | Li | ................... | 323/207 |
| 7,317,625 B2 * | 1/2008 | Zhang et al. | .................... | 363/89 |
| 7,359,224 B2 * | 4/2008 | Li | ................... | 363/89 |
| 8,391,025 B2 | 3/2013 | Walde et al. | | |
| 8,400,792 B2 | 3/2013 | Sato et al. | | |
| 2006/0158912 A1 * | 7/2006 | Wu et al. | ......................... | 363/89 |
| 2009/0244937 A1 | 10/2009 | Liu | | |

FOREIGN PATENT DOCUMENTS

| | | |
|---|---|---|
| CN | 1428922 | 7/2003 |
| WO | 2011/151940 | 12/2011 |

OTHER PUBLICATIONS

P. Tenti, G. Spiazzi, Harmonic Limiting Standards and Power Factor Correction Techniques; Sep. 1995; 144 pgs.
Prodic et al., Digitally Controlled Low-Harmonic Rectifier Having Fast Dynamic Responses; pp. 476-482, 2002.
Chen et al., Feedforward Current Control of Boost Single-Phase PFC Converters, IEEE Transactions on Power Electronics, vol. 21 No. 2, Mar. 2006.

* cited by examiner

*Primary Examiner* — Nguyen Tran
(74) *Attorney, Agent, or Firm* — Harness, Dickey & Pierce, P.L.C.

(57) ABSTRACT

A control circuit for controlling one or more power switches of a power converter includes a voltage control loop and a current control loop. The control circuit is configured to generate a current reference for the current control loop using the voltage control loop and an AC reference signal. The control circuit is configured to operate in at least a first mode in which a parameter of the voltage control loop is sampled only at every other zero crossing of the AC reference signal and the sampled parameter is used to generate the current reference for the current control loop. The power converter may be an AC-DC converter or a DC-AC converter (i.e., inverter). Alternatively, the voltage control loop may be sampled at every zero crossing of the AC reference signal, and/or more frequently during transient load conditions.

18 Claims, 7 Drawing Sheets

| LOADING CONDITION | 230V, 60 Hz ||
|---|---|---|
| | THD | PF |
| 10% LOAD | 23.85 | 0.915 |
| 20% LOAD | 13.503 | 0.948 |
| 30% LOAD | 9.662 | 0.975 |
| 40% LOAD | 8.283 | 0.981 |
| 50% LOAD | 6.923 | 0.987 |
| 60% LOAD | 4.57 | 0.992 |
| 70% LOAD | 3.723 | 0.994 |
| 80% LOAD | 3.302 | 0.995 |
| 90% LOAD | 3.097 | 0.996 |
| 100% LOAD | 2.96 | 0.997 |

FIG. 2A

| LOADING CONDITION | 230V, 60 Hz ||
|---|---|---|
| | THD | PF |
| 10% LOAD | 23.39 | 0.926 |
| 20% LOAD | 10.416 | 0.96 |
| 30% LOAD | 7.205 | 0.982 |
| 40% LOAD | 6.830 | 0.987 |
| 50% LOAD | 3.946 | 0.993 |
| 60% LOAD | 2.664 | 0.996 |
| 70% LOAD | 2.242 | 0.997 |
| 80% LOAD | 1.982 | 0.998 |
| 90% LOAD | 1.583 | 0.998 |
| 100% LOAD | 1.373 | 0.998 |

CONTROL CIRCUITS FOR POWER CONVERTERS

FIELD

The present disclosure relates to control circuits for power converters.

BACKGROUND

This section provides background information related to the present disclosure which is not necessarily prior art.

A control circuit for controlling a power switch in an AC-DC power converter may include a voltage control loop to control an output DC voltage and a current control loop to shape an AC input current. The control circuit may generate a current reference for the current control loop based on a signal from the voltage control loop. The current control loop generates a switching signal to control the power switch based on the current reference.

The signal received from the voltage control loop may include ripple that can distort the current reference which, in turn, distorts the AC input current. To reduce the ripple, a bandwidth of the voltage control loop may be reduced well below the ripple frequency.

SUMMARY

This section provides a general summary of the disclosure, and is not a comprehensive disclosure of its full scope or all of its features.

According to one aspect of the present disclosure, a control circuit for controlling one or more switches of a power converter coupled to a load is disclosed. The control circuit includes a voltage control loop and a current control loop. The control circuit is configured to generate a sinusoidal reference for the current control loop using the voltage control loop and an AC reference signal. The control circuit is also configured to operate in at least a first mode in which a parameter of the voltage control loop is sampled only once per each full cycle of the AC reference signal. The sampled parameter is used to generate the sinusoidal reference for the current control loop.

According to another aspect, a control circuit for controlling one or more switches of a power converter coupled to a load is disclosed. The control circuit includes a voltage control loop configured to update a parameter of the voltage control loop at a first frequency, a current control loop, and a detector for detecting a transient load condition. The control circuit is configured to generate a sinusoidal reference for the current control loop using an AC reference signal and (a) the voltage control loop parameter updated at the first frequency when the transient load condition is detected, and (b) the voltage control loop parameter sampled at a second frequency lower than the first frequency and no more than twice per full cycle of the AC reference signal when the transient load condition is not detected.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B illustrate total harmonic distortion (THD) and power factor values for various load conditions of a conventional power converter and the power converter of FIG. 1, respectively.

Corresponding reference numerals indicate corresponding parts throughout the several views of the drawings.

DETAILED DESCRIPTION

Figure 1:
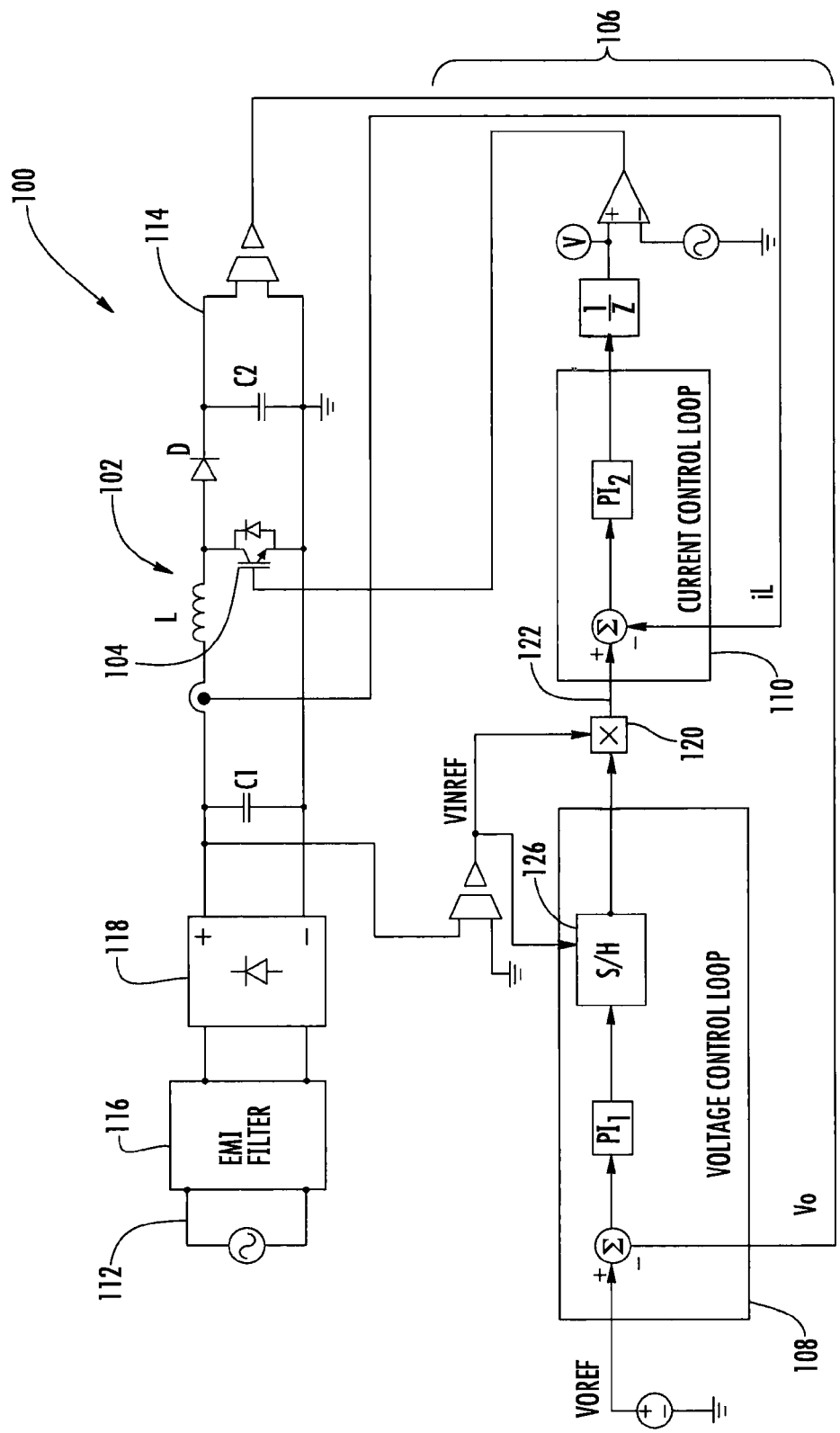
FIG. 1 is a circuit diagram of an AC-DC power converter according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A power converter according to one example embodiment of the present disclosure is illustrated in FIG. 1 and indicated generally by reference number 100. As shown in FIG. 1, the power converter 100 includes a boost converter 102 having a power switch 104, and a control circuit 106 for controlling the power switch 104. The power converter 100 further includes input terminals 112 for coupling to an AC power source, and output terminals 114 for coupling to a load (not shown). A capacitor C2 is coupled across the output terminals 114.

The power converter 100 further includes an electromagnetic interference (EMI) filter 116 coupled to the input terminals 112, and a rectifier 118 coupled between the EMI filter 116 and the boost converter 102. The rectifier 118 is configured to rectify the filtered AC input voltage provided by the AC power source. Although the rectifier 118 is shown as a diode rectifier, any suitable rectifier may be employed.

The control circuit 106 includes a voltage control loop 108, a current control loop 110 and a multiplier 120 coupled between the voltage control loop 108 and the current control loop 110. The voltage control loop 108 may be configured to regulate the DC output voltage of the power converter 100, and the current control loop 110 may be configured to shape the AC input current of the power converter 100.

The control circuit 106 is configured to generate a current reference 122 for the current control loop 110 using the voltage control loop 108 and an AC reference signal (i.e., a sinusoid with alternating positive and negative half cycles). In the particular example shown in FIG. 1, the AC reference signal is the AC input voltage. The control circuit 106 monitors the AC input voltage by sensing the rectified input voltage Vin-ref provided by the rectifier 118 to the boost converter 102. Therefore, the control circuit 106 may be operated with only a positive supply voltage, and does not require a negative supply voltage for processing negative voltage signals.

As shown in FIG. 1, the current reference 122 may be generated by multiplying (via multiplier 120) an output of the voltage control loop 108 with the rectified input voltage. The current reference 122 may be compared to a sensed current iL through an inductor L to generate an error signal. A controller PI2 of the current control loop 110 may process the error signal to generate a signal used by a PWM generator to control the power switch 104. The controller PI2 may be a proportional integral controller or any other suitable type of controller such as, e.g., an integral controller.

The control circuit 106 is configured to operate in one or more modes. In at least one mode, the control circuit samples a parameter of the voltage control loop 108 only once per full cycle of the AC reference signal (e.g., the AC input voltage). Preferably, the control circuit samples the voltage control loop parameter at the same time (i.e., a fixed time) during each full cycle of the AC reference signal. In the example embodiment of FIG. 1, the control circuit samples the voltage control loop parameter at every other zero crossing of the AC input voltage. The control circuit 106 may detect each zero crossing of the AC input voltage by detecting when the rectified input voltage Vin-ref equals about zero volts.

The voltage control loop 108 generates an error signal by subtracting a sensed output voltage Vo of the power converter 100 from a reference voltage Voref. The error signal is then processed by a controller PI1, which may be a proportional integral controller or any other suitable controller.

In the example shown in FIG. 1, the control circuit 106 samples the output of the PI controller PI1 via a sample and hold (S/H) circuit 126. The S/H circuit 126 monitors the rectified input voltage Vin-ref to detect zero crossings of the AC input voltage, and samples the output of the PI controller PI1 only at every other zero crossing of the AC input voltage. Therefore, the output of the S/H circuit 126 (and the voltage control loop 108) changes no more than once per each full cycle of the AC input voltage.

Alternatively, and as further explained below, the control circuit 106 may sample the error signal generated by the voltage control loop 108 before the sampled error signal is processed by the PI controller PI1. In that event, the input to the PI controller PI1 will change no more than once per each full cycle of the AC input voltage. Likewise, the output of the PI controller PI1 (and the voltage control loop 108) will change no more than once per each full cycle of the AC input voltage.

If the output of the voltage control loop 108 changes no more than twice per full cycle of the AC input voltage (e.g., at every zero crossing), the output of the voltage control loop 108 may be substantially constant during each half cycle of the AC input voltage. Therefore, the current reference 122 may be a clean rectified sinusoid in phase with the rectified input voltage Vin-ref, despite any ripple in the output voltage Vo processed by the voltage control loop 108. This, in turn, can prevent any ripple in the output voltage Vo from distorting the AC input current. Therefore, the AC input current may have a low total harmonic distortion (THD), and the power converter 100 may have a high power factor, despite any ripple in the output voltage Vo. Thus, changing the output of the voltage control loop no more than twice per full cycle of the AC input voltage (e.g., only during zero crossings) may reduce distortion in the AC input current without requiring a reduction in the bandwidth (and dynamic response) of the power converter 100.

However, if the output of the voltage control loop 108 changes between two consecutive half cycles of the AC input voltage during a transient (also called dynamic) load condition, the power converter 100 may inject DC current back to the AC input power source. To avoid this, the control circuit 108 is preferably configured to sample a parameter of the voltage control loop 108 only once per full cycle of the AC input voltage (e.g., at every other zero crossing), so the output of the voltage control loop 108 changes no more than once per each full cycle of the AC input voltage.

FIG. 2A provides THD and power factor values corresponding to various load conditions of the power converter 100 but without the S/H circuit 126 (i.e., the output of the voltage control loop 108 can change between zero crossings of the AC input signal). FIG. 2B provides similar values for the power converter 100 with the S/H circuit 126 sampling the output of the voltage control loop only at every other zero crossing of the AC input signal. As shown in FIGS. 2A and 2B, the power converter 100 employing the S/H circuit 126 has a lower THD and a higher power factor for each corresponding load condition as compared to the power converter without the S/H circuit.

Figure 3A:
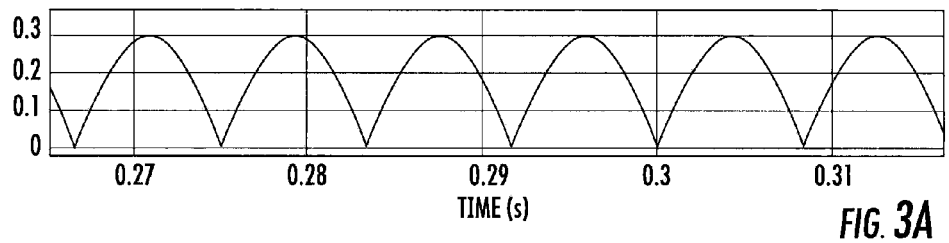
FIGS. 3A-3D illustrate various example waveforms for the power converter of FIG. 1.
Figure 3B:
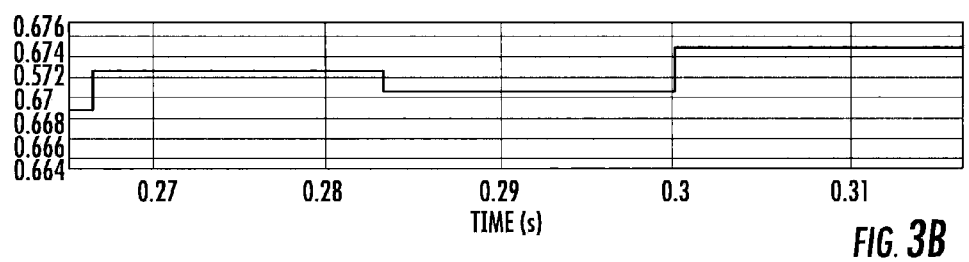
Figure 3C:
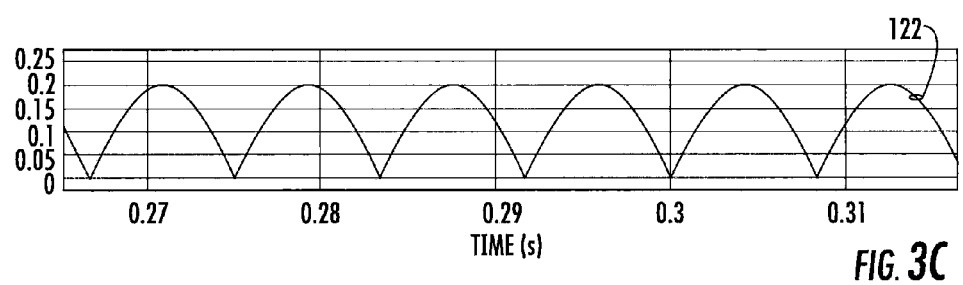
Figure 3D:
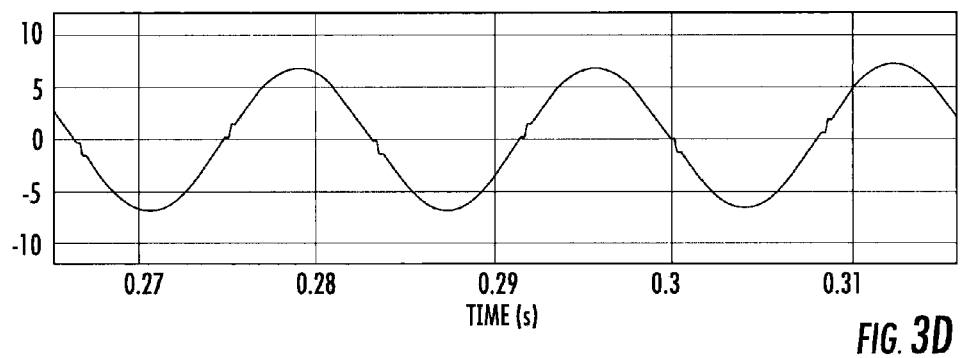

FIGS. 3A-3D illustrate various waveforms of the power converter 100 of FIG. 1. Specifically, FIG. 3A illustrates the rectified input voltage Vin-ref monitored by the control circuit 106. FIG. 3B illustrates the output of the voltage control loop 108, which changes only during every other zero crossing of the AC input voltage. FIG. 3C illustrates the current reference 122 for the current control loop 110. FIG. 3D illustrates the AC input current of the power converter 100.

It should be understood that the teachings described above are not limited to the particular configuration of the example AC-DC converter 100 shown in FIG. 1, and can be applied to numerous other AC-DC converters. Further, the teachings described above are not limited to AC-DC converters, but can also be applied to DC-AC converters (i.e., inverters), as further described below.

Figure 4:
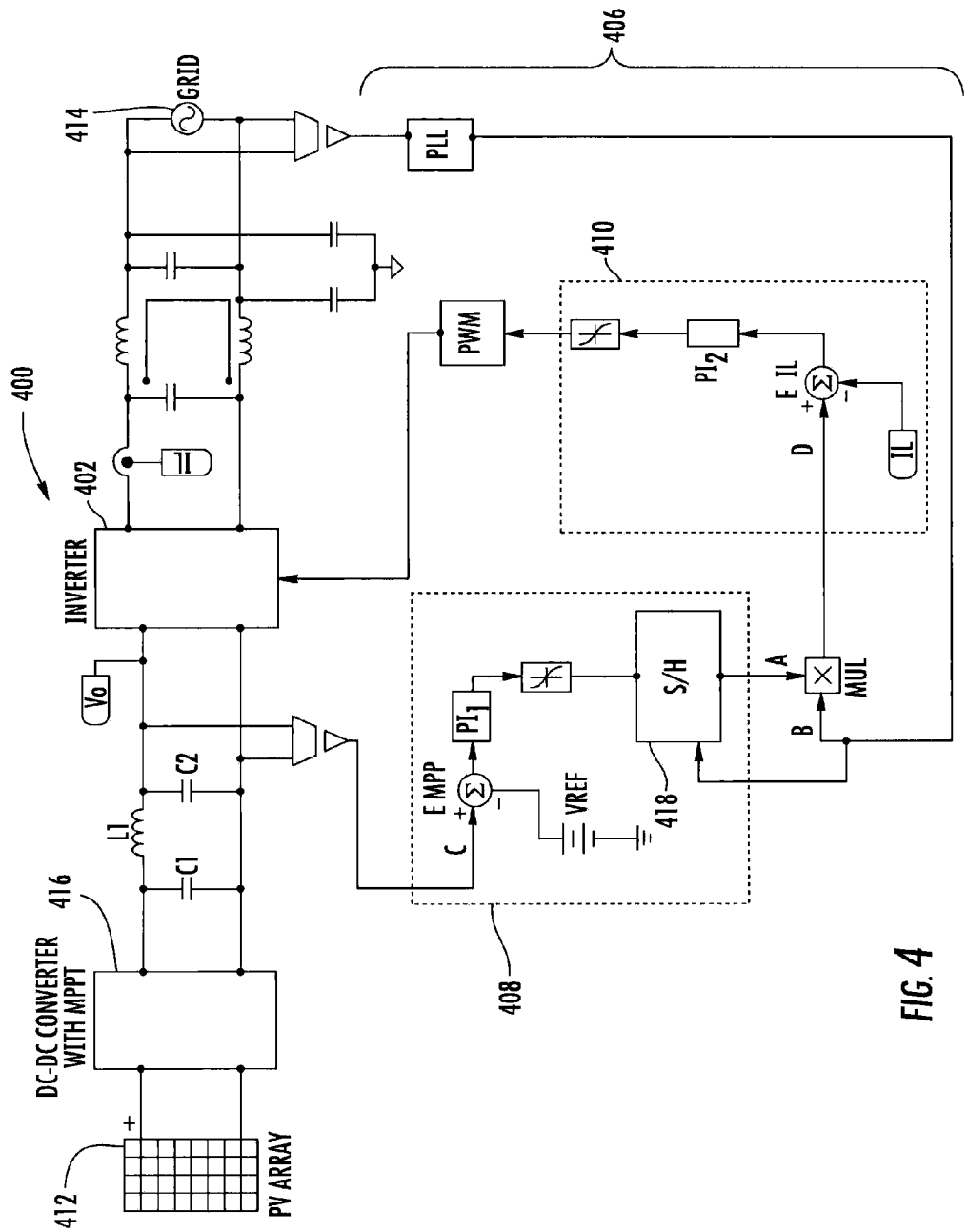
FIG. 4 is a circuit diagram of a power converter having a grid-tied inverter according to another example embodiment.

FIG. 4 illustrates a power converter 400 according to another example embodiment. As shown in FIG. 4, the power converter 400 includes a DC/DC converter 416 having input terminals coupled to a photovoltaic (PV) array 412 and output terminals coupled to the input terminals of a grid-tie inverter 402 having one or more power switches (not shown). The output terminals of the inverter 402 are coupled to an AC utility power grid 414. The power converter 400 further includes a control circuit 406 for controlling the one or more power switches of the inverter 402.

The inverter 402 may be a solar inverter configured to implement a maximum power point tracking (MPPT) function, a micro-inverter or any other suitable inverter. The DC/DC converter 416 may also be configured to implement an MPPT function (in addition to or instead of the inverter 402).

The inverter 402 may operate as an AC current source, and regulate its input voltage by modulating the amount of AC current it supplies to the power grid 414.

The control circuit 406 includes a voltage control loop 408 configured to regulate a DC input voltage to the inverter 402, and a current control loop 410 configured to shape the inverter's AC output current.

The control circuit 406 is configured to generate a current reference D for the current control loop 410 using the voltage control loop 408 and an AC reference signal. In the particular example shown in FIG. 4, the AC reference signal is the AC grid voltage. The AC grid voltage is sensed by the control circuit 406 via a phase lock loop (PLL) circuit and provided to a multiplier MUL as a rectified signal B. As shown in FIG. 4, the current reference D may be generated by multiplying (via multiplier MUL) an output of the voltage control loop 408 with the sensed (and rectified) AC grid voltage B.

The current reference D may be compared to the output current iL of the inverter 402 to generate an error signal. A proportional-integral controller PI2 (or another suitable controller) of the current control loop 410 may process the error signal to generate a signal used by a pulse width modulation (PWM) generator to control the one or more power switches in the inverter 402.

The control circuit 406 is configured to operate in one or more modes. In at least one mode, the control circuit 406 samples a parameter of the voltage control loop 408 only once per each full cycle of the AC reference signal (e.g., the AC grid voltage). Preferably, the control circuit 406 samples the voltage control loop parameter at the same time (i.e., a fixed time) during each full cycle of the AC reference signal. In the example embodiment of FIG. 4, the control circuit samples the voltage control loop parameter at every other zero crossing of the AC grid voltage.

The voltage control loop 408 generates an error signal by subtracting a sensed input voltage C to the inverter 402 from a DC reference voltage Vref. The error signal is then processed by a proportional-integral (PI) controller PI1.

Similar to the control circuit 106 of FIG. 1, the control circuit 406 of FIG. 4 samples the output of the PI controller PI1 via an S/H circuit 418. The S/H circuit 418 monitors the sensed AC grid voltage B to detect zero crossings, and samples the output of the PI controller PI1 only at every other zero crossing of the AC grid voltage. Therefore, the output of the S/H circuit 418 (and the voltage control loop 408) changes no more than once per each full cycle of the AC grid voltage.

If the output of the voltage control loop 408 changes no more than twice per full cycle of the AC grid voltage (e.g., at every zero crossing), the output of the voltage control loop 408 may be substantially constant during each half cycle of the AC grid voltage. Therefore, the current reference D may be a clean sinusoid in phase with the AC grid voltage, despite any ripple in the sensed input voltage C to the inverter 402. This, in turn, can prevent any ripple in the sensed input voltage C from distorting the inverter's AC output current. Therefore, the AC output current may have a low total harmonic distortion (THD), despite any ripple in the sensed input voltage C. Thus, changing the output of the voltage control loop no more than twice per full cycle of the AC grid voltage (e.g., only during zero crossings) may reduce distortion in the inverter's AC output current without requiring a reduction in the bandwidth of the voltage control loop 408.

However, if the output of the voltage control loop 408 changes between two consecutive half cycles of the AC grid voltage, the inverter 402 may inject DC current into the AC utility power grid. To avoid this, the control circuit 406 is preferably configured to sample a parameter of the voltage control loop 408 only once per full cycle of the AC grid voltage (e.g., at every other zero crossing), so the output of the voltage control loop 408 changes no more than once per each full cycle of the AC grid voltage.

As explained above with reference to FIG. 1, distortion in the AC input current will be reduced or substantially eliminated if output of the voltage control loop changes no more than twice per each full cycle of the AC input voltage. However, the power converter 100 may experience excessive output voltage undershoot during transient load conditions due to the delay of one full or half cycle in responding to the changing load. For example, in one implementation where the voltage loop output was updated only at every zero crossing of the AC input voltage, the output voltage dropped about 50 VDC in response to the load changing from 10% to 100% of the rated load. Similarly, in an implementation where the voltage loop output was updated even less frequently, at every other zero crossing of the AC input voltage, the output voltage dropped about 70 VDC in response to the load changing from 10% to 100% of the rated load.

According to another aspect of the present disclosure, the output voltage undershoot due to a transient load condition can be reduced by updating the voltage control loop output more frequently than every other (or every) zero crossing of the AC input voltage during transient load conditions. Some example circuits for implementing this aspect of the present disclosure will now be described with reference to FIGS. 5-7.

Figure 5:
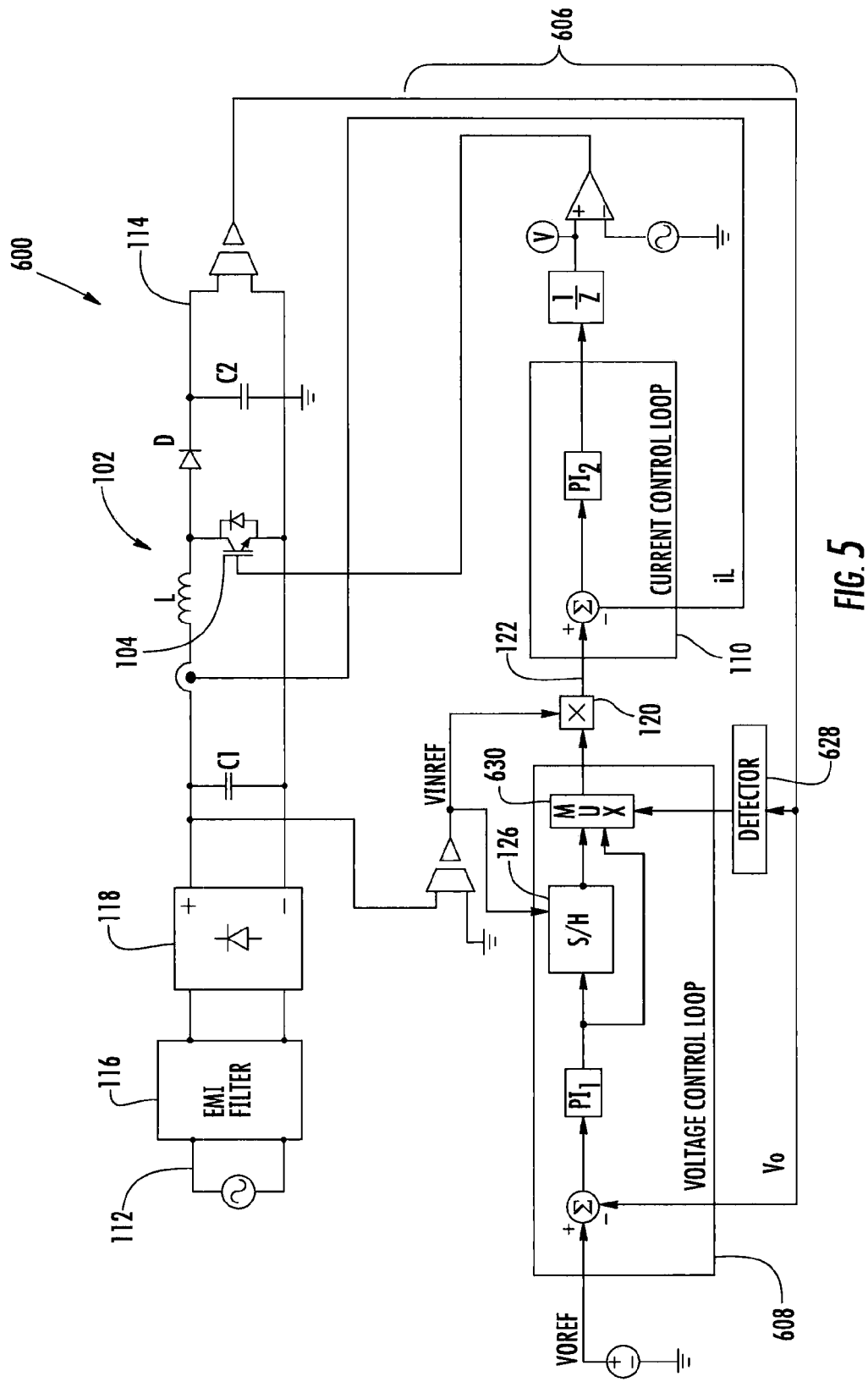
FIG. 5 is a circuit diagram of a power converter having a transient load condition detector according to yet another example embodiment.

FIG. 5 illustrates a power converter 600 according to another example embodiment of the present disclosure. The power converter 600 is similar to the power converter 100 of FIG. 1. However, in the power converter 600 of FIG. 6, the control circuit 606 includes a detector 628 for detecting a transient load condition, and a multiplexer 630 coupled to the detector 628 and the voltage control loop 608.

The S/H circuit 126 in FIG. 5 may be configured to sample the output of the controller PI1 only once or twice during each full cycle of the AC input signal (e.g., at every other or every zero crossing of the AC input signal). The output of the S/H circuit 126 is coupled to the multiplexer 630, which receives a signal from the detector 628 indicating whether a transient load condition is detected. When no transient load condition is detected, the multiplexer 630 couples the output of the S/H circuit 126 to the multiplier 120, and the control circuit 606 operates much like the control circuit 106 of FIG. 1. However, when a transient load condition is detected, the multiplexer 630 of FIG. 6 bypasses the S/H circuit 126 by coupling the output of the controller PI1 to the multiplier 120. Because the output of the controller PI1 is updated more frequently than every zero crossing of the AC input signal, the control circuit 606 can quickly respond to the changing load condition, resulting in less (or substantially no) output voltage undershoot.

Figure 6:
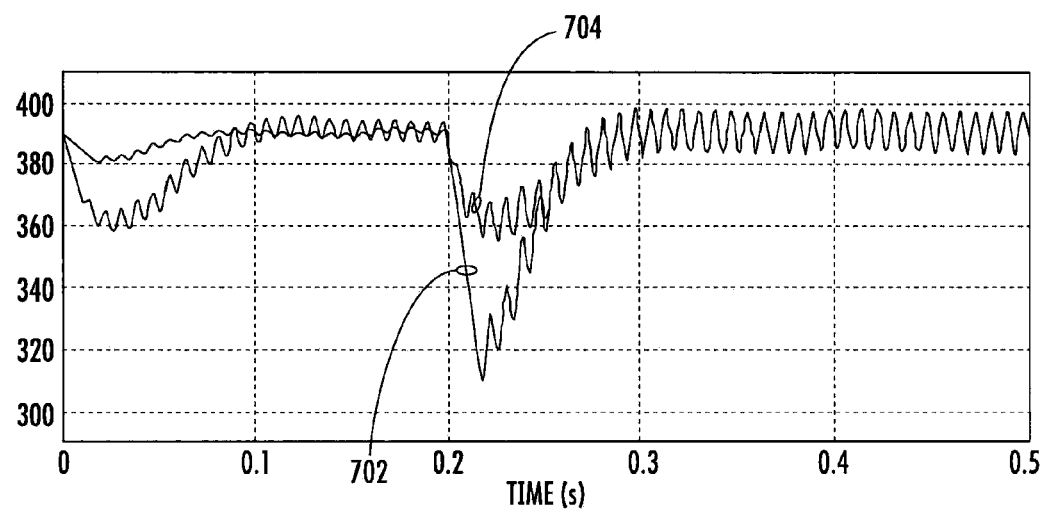
FIG. 6 illustrates output voltage undershoot during transient load conditions for the power converter of FIG. 5 and a similar power converter that does not include a transient load condition detector.

As shown in FIG. 6, the detector 628 detects a transient load condition by monitoring the sensed output voltage Vo. Alternatively, the detector 628 may detect transient load conditions by monitoring another suitable parameter of the power converter 600, such as the output current, the input current, the error signal generated in the voltage control loop 608, etc. Additionally, the detector 628 may be, e.g., a window detector that indicates to the multiplexer 630 when the monitored parameter is outside a defined range, such as a defined voltage, current or error signal range.

In one example implementation, the power converter 600 has an AC input voltage of 230V at 60 Hz and a DC output voltage set point of 390V with a maximum expected maximum ripple of plus or minus 10V (including the regulation tolerance). Therefore, the detection window of the detector 628 may be set at 390V plus or minus 15V. In that event, if the sensed output voltage Vo is above 405V or below 375V, the detector 628 will provide a signal to the multiplexer 630 indicating a transient load condition is detected.

The output of the controller PI1 is preferably updated at a frequency that is substantially greater than the frequency at which the S/H circuit 126 samples its output. In one example implementation, the output of the controller PI1 is updated at a frequency of 7 kHz. Therefore, if the S/H circuit 126 is configured to sample the output of the controller PI1 at every zero crossing of the AC input voltage (i.e., at 120 Hz), the output of the voltage control loop 608 (which is used to generate the current reference 122) will be updated at 120 Hz during static load conditions, and at 7 kHz during dynamic load conditions. As shown in FIG. 6, the output voltage undershoot 704 during a transient load condition for the power converter 600 of FIG. 5 is notably less than the output voltage undershoot 702 during a transient load condition for the power converter 100 of FIG. 1 (configured to sample the voltage control loop output at every other zero crossing of the AC input voltage).

Figure 7:
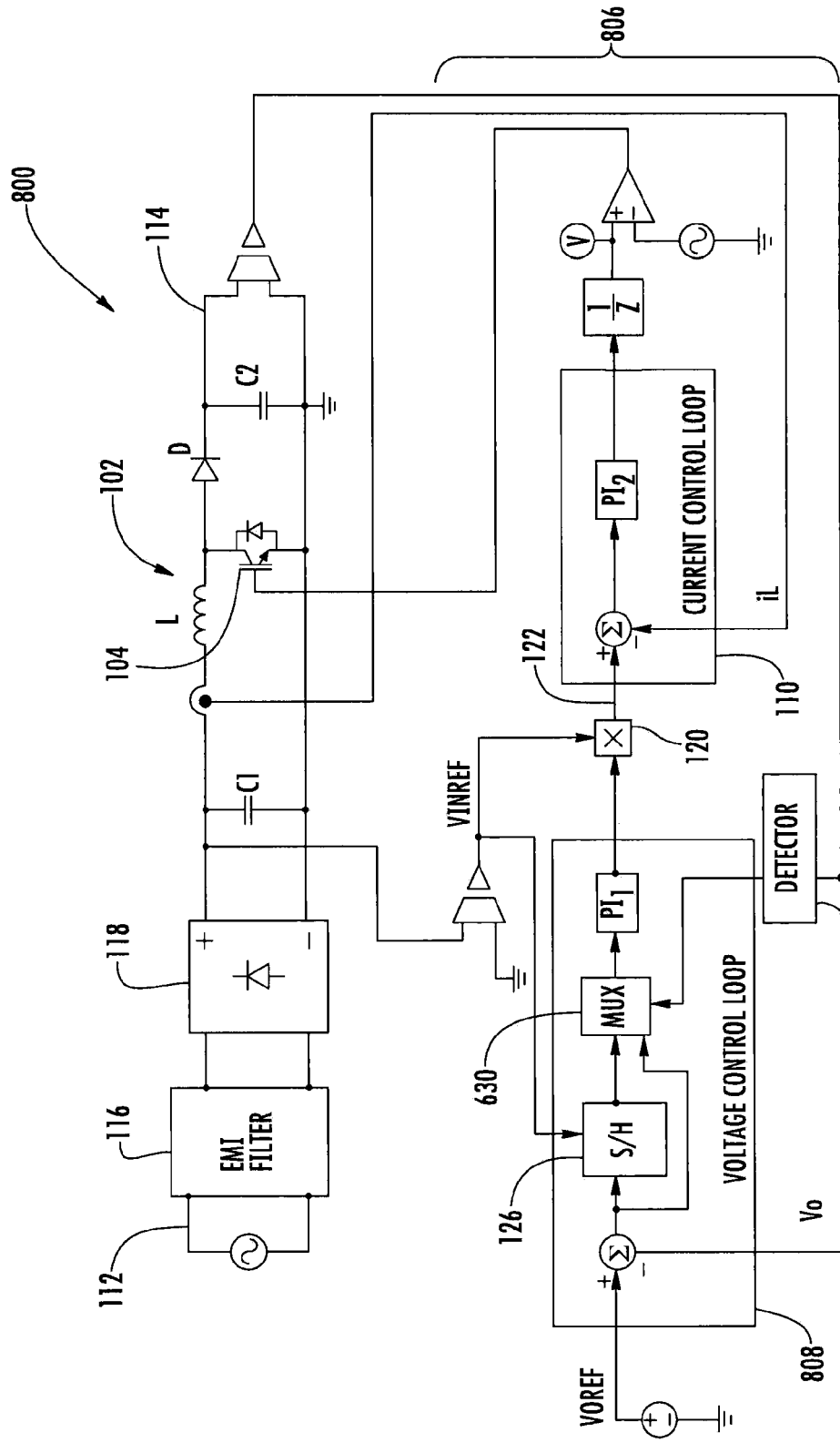
FIG. 7 is a circuit diagram of a power converter having a transient load condition detector according to still another example embodiment.

FIG. 7 illustrates a power converter 800 according to another example embodiment. The power converter 800 is similar to the power converter 600 of FIG. 5. However, in the power converter 800 of FIG. 7, the S/H circuit 126 and multiplexer are positioned between the error signal generator and the PI controller PI1. Similar to the voltage control loop of FIG. 5, the output of the voltage control loop is updated at every other (or every) zero crossing during static load conditions, and at a higher frequency (i.e., the update rate of the PI controller PI1) during transient load conditions.

The various control circuits described above may be configured to implement average current mode (ACM) control, including continuous ACM control, or any other suitable control mode. Further, the power converters described herein may be implemented using analog and/or digital components. For example, the control circuits may include one or more digital processors, such as microprocessors and digital signal processors (DSPs), which may be configurable with software instructions stored in onboard and/or external memory. Further, while some power converters have been described as including boost converters, it should be understood that other types of power converters, including other types of switched mode power supplies, may be employed without departing from the teachings of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power converter comprising:
   an inverter for coupling to a utility grid, the inverter comprising a power circuit having at least one power switch; and
   a control circuit for controlling the at least one power switch, the control circuit including a voltage control loop and a current control loop, the control circuit configured to generate a current reference for the current control loop using the voltage control loop and an AC reference signal, the control circuit configured to operate in at least a first mode in which a parameter of the voltage control loop is sampled only once per full cycle of the AC reference signal and the sampled parameter is used to generate the current reference for the current control loop.

2. The power converter of claim 1 wherein the control circuit is configured to sample the voltage control loop parameter at a fixed time during each full cycle of the AC reference signal.

3. The power converter of claim 2 wherein the fixed time is during a zero crossing of the AC reference signal.

4. The power converter of claim 3 wherein the AC reference signal is an AC voltage of the utility grid.

5. The power converter of claim 4 wherein the control circuit includes a phase lock loop (PLL) for monitoring the AC voltage of the utility grid.

6. The power converter of claim 5 wherein the voltage control loop is configured to regulate a DC input voltage of the inverter and the current control loop is configured to shape an AC output current of the inverter.

7. The power converter of claim 1 wherein the control circuit is configured to implement average current mode (ACM) control using the voltage control loop and the current control loop.

8. The power converter of claim 1 wherein the voltage control loop includes a proportional-integral controller and the sampled parameter is an output of the proportional-integral controller.

9. The power converter of claim 1 wherein the sampled parameter is an error signal produced by the voltage control loop.

10. The power converter of claim 9 wherein the voltage control loop includes a proportional-integral controller for processing the sampled parameter.

11. The power converter of claim 1 wherein the inverter is a grid-tie inverter.

12. The power converter of claim 1 wherein the inverter is a solar inverter configured to implement a maximum power tracking function.

13. The power converter of claim 1 wherein the AC reference signal is an AC voltage of the utility grid.

14. The power converter of claim 13 wherein the control circuit is configured to sample the voltage control loop parameter at a fixed time during each full cycle of the AC reference signal.

15. The power converter of claim 4 wherein the control circuit is configured to implement average current mode (ACM) control using the voltage control loop and the current control loop.

16. The power converter of claim 4 wherein the voltage control loop includes a proportional-integral controller and the sampled parameter is an output of the proportional-integral controller.

17. The power converter of claim 4 wherein the sampled parameter is an error signal produced by the voltage control loop.

18. The power converter of claim 17 wherein the voltage control loop includes a proportional-integral controller for processing the sampled parameter.

* * * * *